United States Patent
Haga et al.

(10) Patent No.: US 6,317,204 B2
(45) Date of Patent: *Nov. 13, 2001

(54) SURFACE INSPECTING DEVICE AND SURFACE INSPECTING METHOD

(75) Inventors: Kazumi Haga; Motoshi Sakai; Yoshihiro Ishiguro, all of Tokyo (JP)

(73) Assignee: Newcreation Co., Ltd., Komae (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,052
(22) PCT Filed: Mar. 19, 1998
(86) PCT No.: PCT/JP98/01170
§ 371 Date: Jan. 18, 2000
§ 102(e) Date: Jan. 18, 2000
(87) PCT Pub. No.: WO98/44315
PCT Pub. Date: Oct. 8, 1998

(30) Foreign Application Priority Data

Mar. 28, 1997 (JP) .................................................. 9-077985

(51) Int. Cl.$^7$ .................................................. G01N 21/00
(52) U.S. Cl. .................... 356/237.2; 356/600; 356/237.5
(58) Field of Search ............................ 356/237.2, 237.3, 356/237.4, 237.5, 239.7, 239.8, 600

(56) References Cited

U.S. PATENT DOCUMENTS

| | | | |
|---|---|---|---|
| 3,782,827 | * | 1/1974 | Nisenson et al. .................. 356/237.2 |
| 5,177,559 | * | 1/1993 | Batchelder et al. ............... 356/237.2 |
| 5,428,442 | * | 6/1995 | Lin et al. ........................... 356/237.2 |
| 5,737,074 | * | 4/1998 | Haga et al. ........................ 356/237.2 |

* cited by examiner

Primary Examiner—Hoa Q. Pham
Assistant Examiner—Sang H. Nguyen
(74) Attorney, Agent, or Firm—Crowell & Moring LLP (57) ABSTRACT

A method enables measurement of the configuration of a pattern with irregularity in a wide surface region with a high accuracy and in a single operation. The surface inspecting method includes irradiating a measurement objective region with an illuminating light in an oblique direction thereto; forming an image of reflected light from the measurement objective region, the formed image of reflected light having points with luminance corresponding to the incident angle of the illuminating light at respective points on the measurement objective region picking up the formed image to collect luminance data of respective points in the measurement objective region; analyzing spatial frequencies of the luminance data with respect to positions in a desired direction to make a plurality of spatial frequency data; and extracting a desired frequency component from the plurality of spatial frequency data.

18 Claims, 9 Drawing Sheets

ILLUMINATION ANGULAR APERTURE

FIG. 3a

OBJECT-SIDE ANGULAR APERTURE

FIG. 3b

NO REFLENCTION INCLUDED IN
OBJECT-SIDE ANGULAR APERTURE

ILLUMINATION ANGULAR APERTURE

INCIDENCE

FIG. 4a

REFERENCE PLANE

OBJECT-SIDE ANGULAR APERTURE

REFLECTION

FIG. 4b

REFLENCTION PARTIALLY INCLUDED IN OBJECT-SIDE ANGULAR APERTURE

SURFACE INSPECTING DEVICE AND SURFACE INSPECTING METHOD

FIELD OF THE INVENTION

This invention relates to a surface inspecting method and an apparatus for carrying out the inspecting method, for measuring the shape or the state of surfaces of measurement objective regions, more particularly, to a surface inspecting method and a surface inspecting apparatus, suitable for inspection of surface characteristics of specific measurement objective regions, which comprises a periodic irregular pattern formed thereon.

BACKGROUND OF THE INVENTION

Measurement of the shape or the state of a surface of an object is carried out for an instrumentation of the object's characters, a decision whether the quality of the object is good or not as a product, and the like. In particular, measurement of the shape or the state of the surface of the object is often used for measuring the irregularity of a surface of an object having an approximate plate-like shape.

Figure 9:
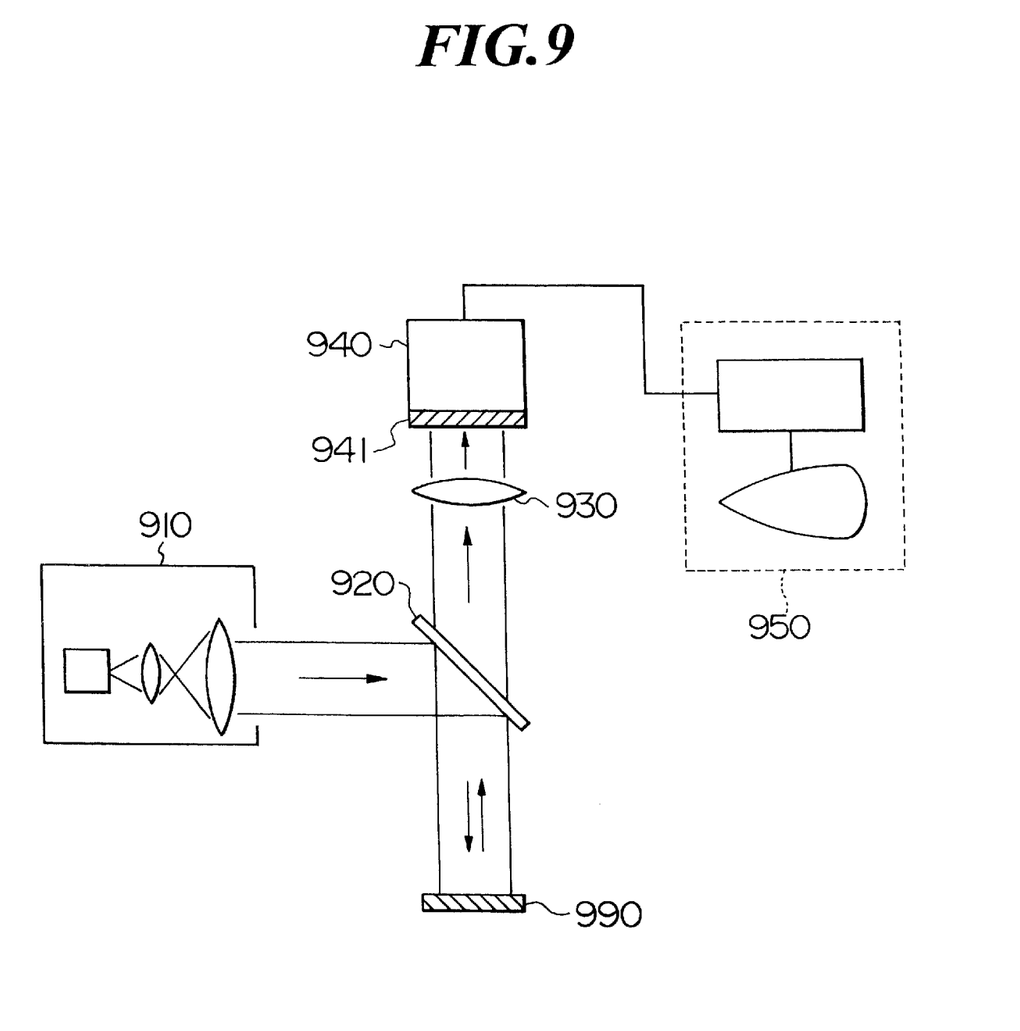
FIG. 9 is a view showing the construction of a conventional surface inspecting apparatus.

FIG. 9 shows a typical example of a measuring apparatus for measuring the irregularity of the surface of the object having an approximate plate-like shape. As shown in FIG. 9, the measuring apparatus is provided with (a) a light source 910 for generating substantially parallel light beams, (b) a half mirror 920 for accepting the light beams output from the light source 910 and for outputting these light beams toward a specific measurement objective region on the object 990 to be measured, (c) an optical image formation system 930 for receiving the reflected light from the measurement objective region of the object 990 to be measured and for forming an optical image thereof, (d) an image pickup part 940 having a light receiving surface 941 at the image formation surface of the optical image formation system 930, and (e) an image information processor 950 for collecting the luminance data output from the image pickup part 940 and for image processing the collected data.

By using the above-described measuring apparatus, measurement of the shape or the like of the measurement objective region is carried out as follows. A substantially parallel light beam outputs from the light source 910 are irradiated through the half mirror 920 onto measurement objective regions of the object 990 to be measured. Light beams reflected from the measurement objective region forms an image through the image formation system 930, and the formed image is picked up by the image pickup part 940. The picked up image results are output from the image pickup part 940 and are collected by the image information processor 950. The processor 950 reconstructs the image of the measurement objective region by processing the collected luminance data. By inspection of the obtained image of the measured objective region, the presence or absence of irregularity or the position of the irregularity is measured through fading or blurry portions in the image.

Conventionally, since an object shape measurement has been carried out as described above, an approximate shape of the irregular portion could be recognized. However, when the irregularity is formed as a periodic pattern, for example, a circuit pattern is formed on a surface of a wafer, a precise measurement for the shape of the irregular pattern could not be performed.

Accordingly, in order to precisely measure the shape of the irregular pattern, use of a large scale, complicated and expensive apparatus such as a scanning confocal electron microscope has been required.

The present invention was developed in view of the above-described problems. An object of the present invention is to provide an improved surface inspecting method which enables measurement of the configuration of a pattern with irregularity in a wide surface region with a high accuracy and in a single operation by using an apparatus having relatively simple construction. Another object of the present invention is to provide an improved surface inspecting apparatus having a simple construction for suitably carrying out the surface inspecting method according to the invention.

SUMMARY OF THE INVENTION

The improved surface inspecting method of the invention according to the present invention is one for inspecting a surface condition a measurement objective region to be measured, which comprises a periodic irregular pattern with a period, by irradiating the measurement objective region with an illuminating light of an approximately parallel beam, comprising: a first step of irradiating a measurement objective region with an illuminating light in an oblique direction thereto; a second step of forming an image of reflected light from the measurement objective region by one system selected from the group consisting of an object-side telecentric optical system and an image-object-side telecentric optical system, which has an optical axis coinciding with an incident direction of the illuminating light to the measurement objective region, the formed image of reflected light having points with luminance corresponding to the incident angle of the illuminating light at respective points on the measurement objective region; a third step of picking up the formed image to collect luminance data of respective points in the measurement objective region; a fourth step of analyzing spatial frequencies of the luminance data with respect to positions in a desired direction to make a plurality of spatial frequency data; and a fifth step of extracting a desired frequency component from the plurality of spatial frequency data, to synthesize. In this specification, the term "parallel beam" or "parallel light flux" includes not only a perfect parallel beam or light flux but an approximately parallel beam or light flux which is formed by a pseudo-point light source.

The improved surface inspecting apparatus of the invention according to the present invention is one for inspecting a surface condition which comprises a periodic irregular pattern with a predetermined period of a measurement objective region to be measured by irradiating the measurement objective region with an illuminating light of a parallel beam, comprising: a light irradiation part for irradiating an measurement objective region with an illuminating light in an oblique direction of the measurement objective region; a system selected from the group consisting of an object-side telecentric optical system and an image-object-side telecentric optical system, for forming an image of reflected light from the measurement objective region, which has an optical axis coinciding with an incident direction of the illuminating light to the measurement objective region, the formed image of reflected light having points with luminance corresponding to the incident angle of the illuminating light at respective points on the measurement objective region; an image pickup part for picking up the formed image to collect luminance data of respective points in the measurement objective region; a first data changing part for analyzing spatial frequencies of the luminance data with respect to positions in a desired direction to make a plurality of spatial frequency data; and a second data changing part for extracting a desired frequency component from the plurality of spatial frequency data, to synthesize.

According to the present invention, the spatial frequency of periodic luminance data with respect to positions are analyzed in a predetermined direction to determine a plurality of spatial frequency data, and then a desired frequency component is extracted from the spatial frequency data, to synthesize, so that it is possible to detect a desired irregular state.

For example, it is possible to detect just an irregular state of a particular pattern of an integrated circuit formed on a semiconductor wafer with an eliminated irregular state of a base itself, or just the irregular state of the base itself with an eliminated irregular state of the particular pattern of the integrated circuit. It is extremely useful for the latter steps of the semiconductor device production (i.e., steps for producing the integrated circuit). The reason for this is that it is possible to inspect a warp of the semiconductor wafer by an influence of heat, a warp of the semiconductor wafer by formation of a passivation film or the like, a formation condition of a particular pattern of wiring, in each step.

In the present invention, before analyzing spatial frequencies of the luminance data with respect to positions, for example, it is possible to determine an inclination distribution in the measurement objective region by primary differentiating a distribution of a luminance data, to determine an integral data of the luminance data, and to determine a regression curve from the integral data. Further, it is possible to frequency-analyze the integral data, or to frequency-analyze the irregular data in the measurement objective region, which are determined on the basis of the difference between the regression curve and the integral data.

The light from the light source can be irradiated to the measurement objective region through a band pass filter, or the reflected light from the measurement objective region can be picked up to form an image, through a band pass filter. Accordingly, it is possible to remove the adverse effect caused by the diffracted light from the measurement objective region. In particular, this is effective when there are a large number of fine irregularities having a small pitch in the measurement objective region.

PREFERRED EMBODIMENT FOR CARRYING OUT THE INVENTION

Figure 1:
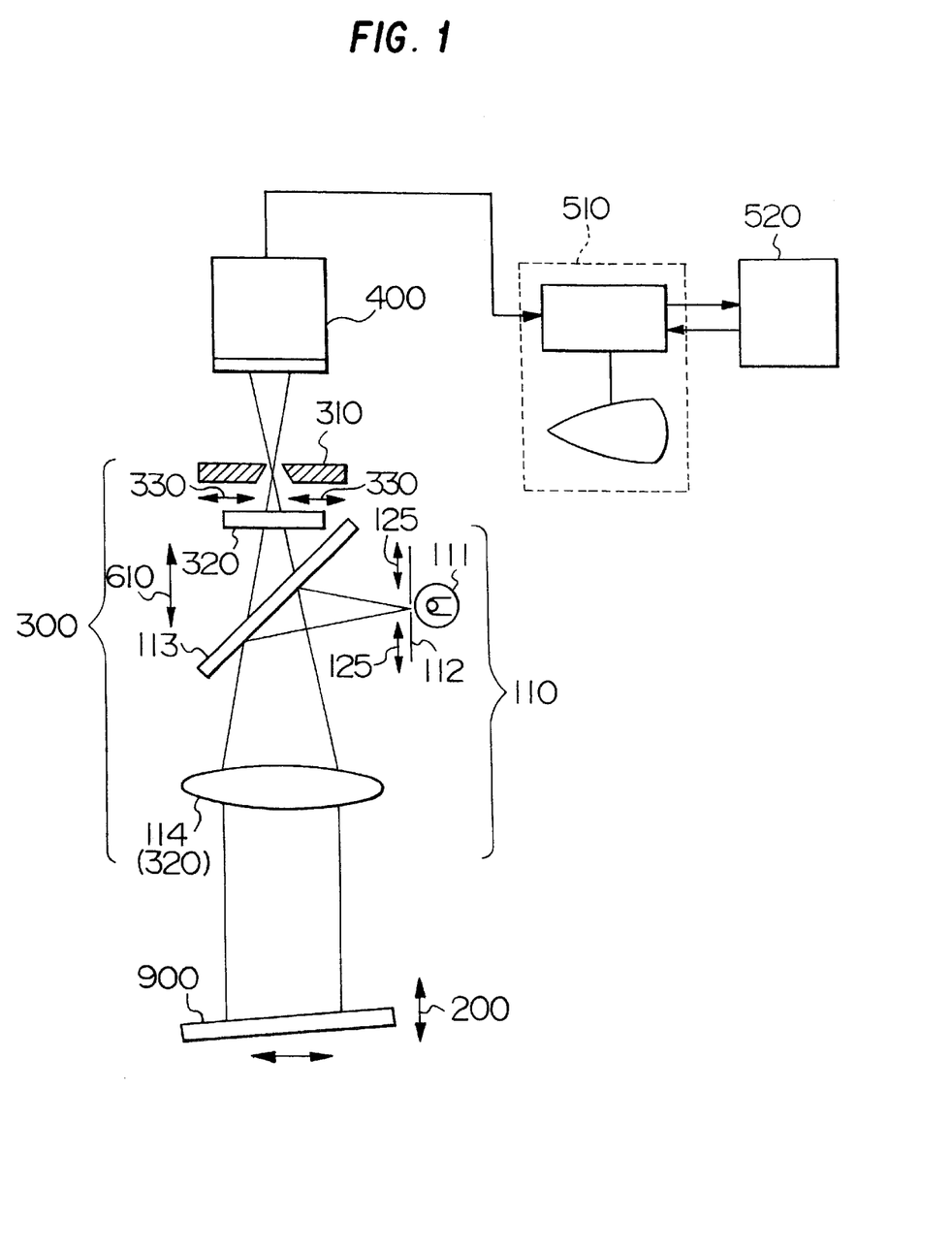
FIG. 1 is a view showing the construction of a surface inspecting apparatus according to the first embodiment of the present invention.

Hereinafter, the surface inspecting method and the surface inspecting apparatus according to embodiments of the present invention will be explained with reference to the attached figures. In the figures explaining a plurality of embodiments, the same structural members, elements or the like are designated with the same reference numerals, and FIG. 1 shows a construction of a surface inspection apparatus according to the first embodiment of the present invention. As shown in this figure, this apparatus is provided with: a light irradiation section 110 for irradiating an measurement objective region with an illuminating light of a parallel light beam; an angle setting member 200 which enables inclination of the measurement objective region so as to irradiate the measurement objective region with an illuminating light from an oblique direction with respect to the surface of the measurement objective region; an object-side telecentric optical system 300 having an optical axis coinciding with the incident direction of the illuminating light onto the measurement objective region and having a predetermined object-side angular aperture with respect to a point on the measurement objective region so as to form an image of reflected light issued from the measurement objective region; an image pickup part 400 for picking up the formed image to collect luminance data of respective pixels (respective points on measurement objective region); a data transform part (first and second data transform parts) 520 for frequency-analyzing the luminance data in a predetermined direction by Fourier transform to determine a plurality of frequency data, or for extracting the predetermined frequency component from the plurality of frequency data and carrying out the inverse Fourier transform; and a processing part 510 for determining an integral data of the luminance or the like and for determining the surface the inverse Fourier transform; and a processing part 510 for determining an integral data of the luminance or the like and for determining the surface characteristics of the measurement objective region.

In this construction, the light irradiating section 110 comprises a light source 111, an aperture 112, a half mirror 113 and a collimating lens 114. The collimating lens 114 constitutes also a part of the image formation system. Further the object-side telecentric optical system 300 is provided with (1) an image formation lens system 320 including the collimating lens 114, (2) a light limiting member 310 such as an aperture stop, an aperture or the like, located at the position of a stop of the object-side telecentric optical system 300, and (3) an angular aperture changing member 330 for changing the aperture diameter of the light limiting member 310 to change the object-side angular aperture of the object-side telecentric optical system 300.

According to the first embodiment, the surface inspecting apparatus uses the fact that the reflected light of the irradiated illuminating light, issued from the measurement objective region forms an image with a luminance which depends on the incident angle (average of the incident angle) of the illuminating light at respective points in the measurement objective region.

The reason why the luminance at each point of the image corresponds to the incident angle at the each corresponding point in the measurement objective region is as follows.

Figure 2A:
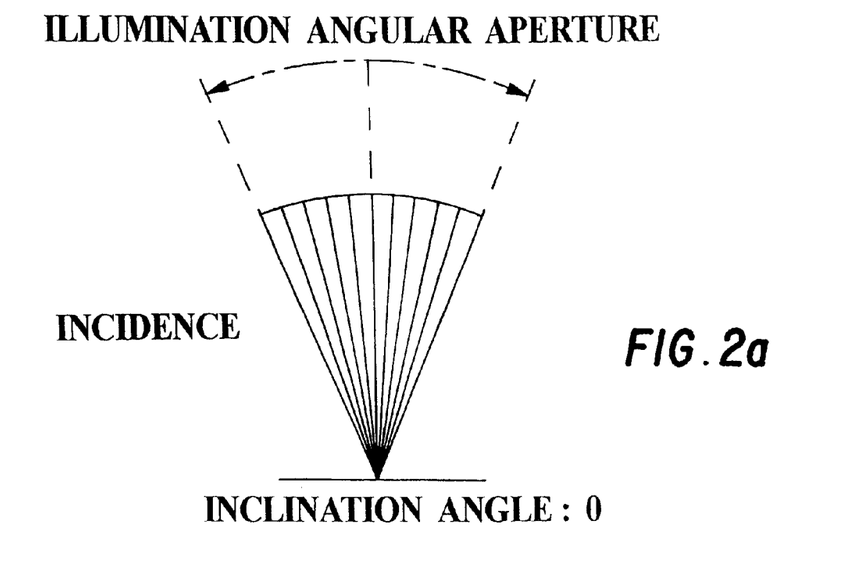
FIGS. 2A–2B are explanation views of image forming operation of the surface inspecting apparatus according to the present invention.
Figure 2B:
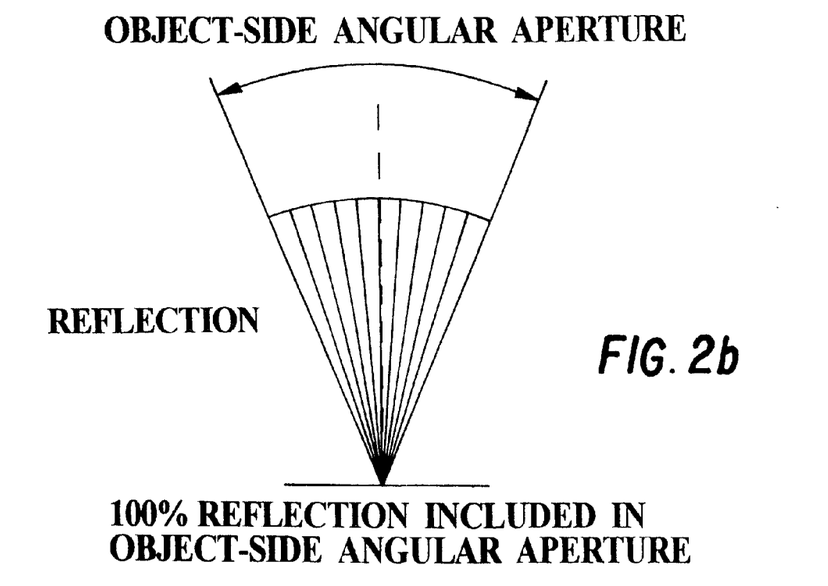

Generally, in order to generate a parallel light beam through the collimating lens 114, a point light source is produced by using a light source 111 and an aperture or an aperture stop 112. However, since the aperture or the aperture stop 112 has a certain degree of size, a perfect point source cannot be obtained. Accordingly, since the light beams collimated through the collimating lens 114 are not perfect parallel light beams, light beams having various angle components corresponding to the angular aperture of the aperture or the aperture stop 112 illuminate respective points of the measurement objective region. In other words, the illuminating light is irradiated on the measurement objective region with a certain illumination angular aperture. As a result, even when the measurement objective region has an even surface, reflecting lights which are diverged with a certain angle scope is generated at the each point under the Reflection Law. Assuming now a case where the object-side angular aperture θ is set such that the whole reflecting light beams from a surface parallel to a plane (a reference plane) perpendicular to the incident direction (an average incident direction) of the illuminating light enter just into the aperture stop 310 (that is, in the case of the irradiating angular aperture being equal to the object-side angular aperture θ), the incident illuminating light with a certain irradiating angular aperture shown in FIG. 2(a) is reflected on the measurement object region, while the reflected light is diffused in the full scope of θ, as shown in the FIG. 2(b). In this case, the whole reflecting light are taken into the aperture of the aperture stop 310 to reach the image pick up part 400, so that a bright image with a luminance of 100% is obtained on the surface of this part 400.

Figure 3A:
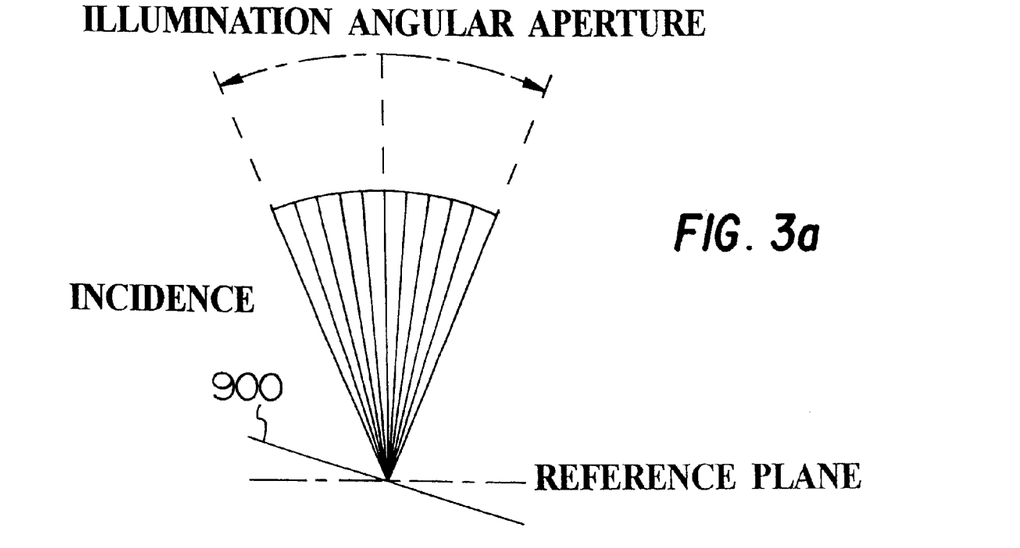
FIGS. 3A–3B are explanation views of image forming operation of the surface inspecting apparatus according to the present invention.
Figure 3B:
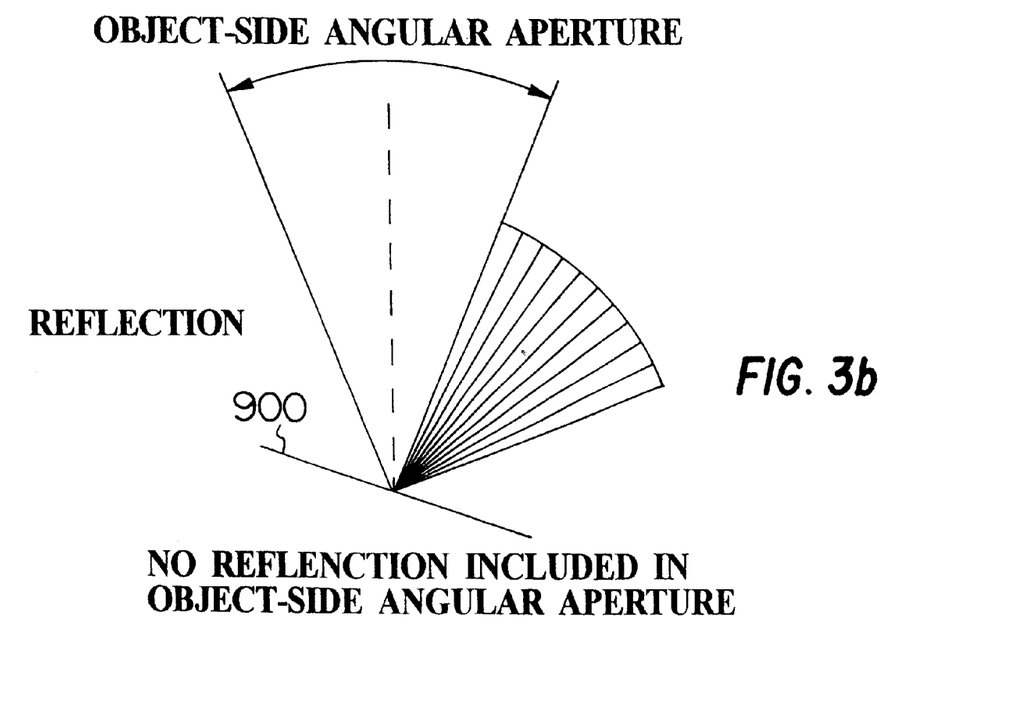
Figure 4A:
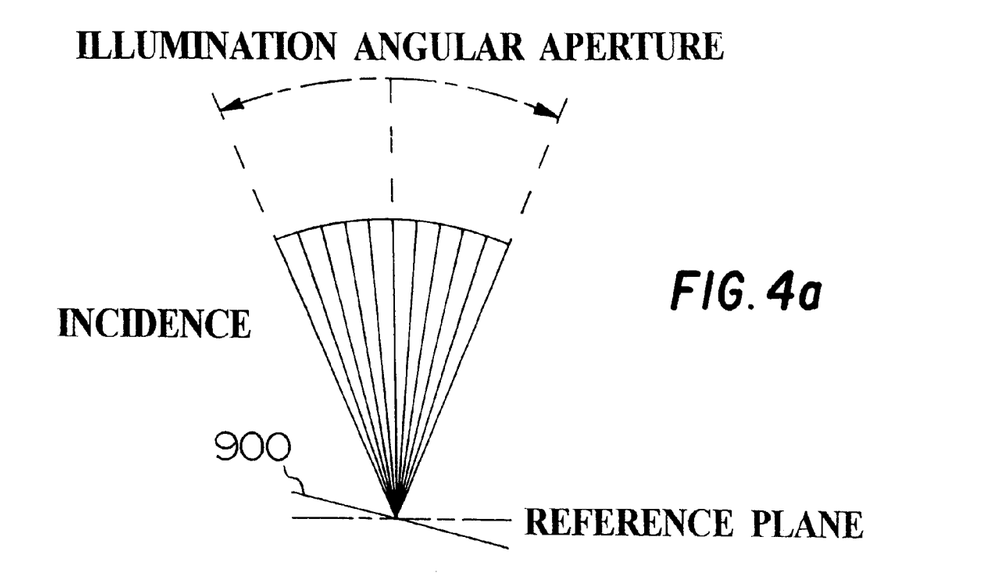
FIGS. 4A–4B are explanation views of image forming operation of the surface inspecting apparatus according to the present invention.
Figure 4B:
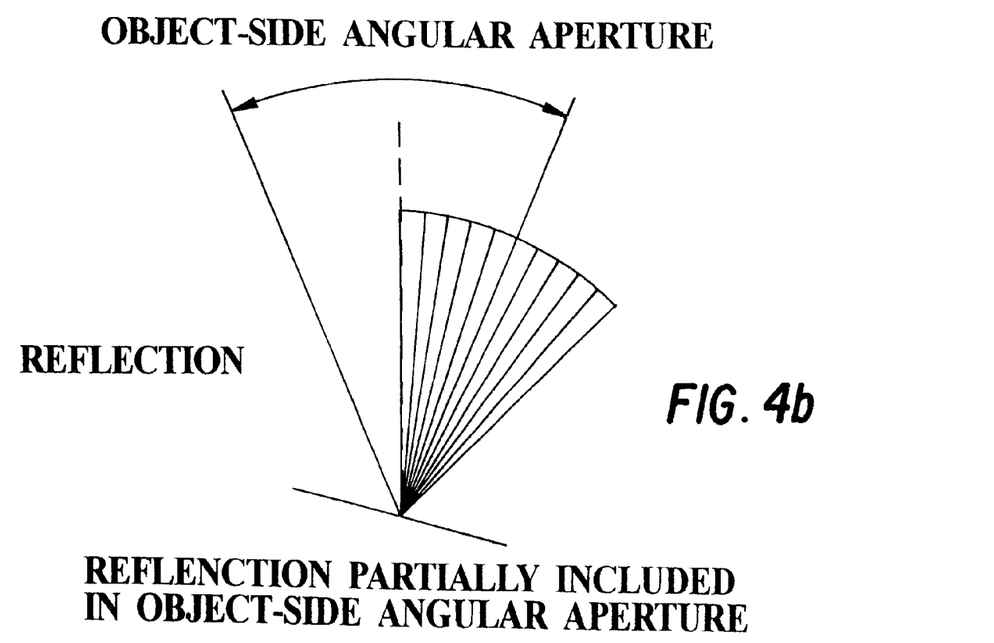

On the other hand, in the case of a surface inclined to the reference plane, the incident illuminating lights shown in FIG. 3 or FIG. 4 are reflected on the surface of the measurement objective region, and the whole or a part of the reflected light are not taken into the aperture of the aperture stop 310 (shown in FIG. 3 or FIG. 4), so that the obtained image becomes a dark one with a luminance of 0% or one with a luminance corresponding to the quantity of light passing through the aperture of the aperture stop 310. Next, it is assumed that a conical concave is found in the measurement objective region (substantially flat surface) of the object 900 to be measured, and that there is a relationship of $d=(L/2) \tan(\theta'/2)$ among the inclination angle $\theta'/2$ of the sloping surface of the concave, the diameter L thereof, and the depth d thereof.

Figure 5:
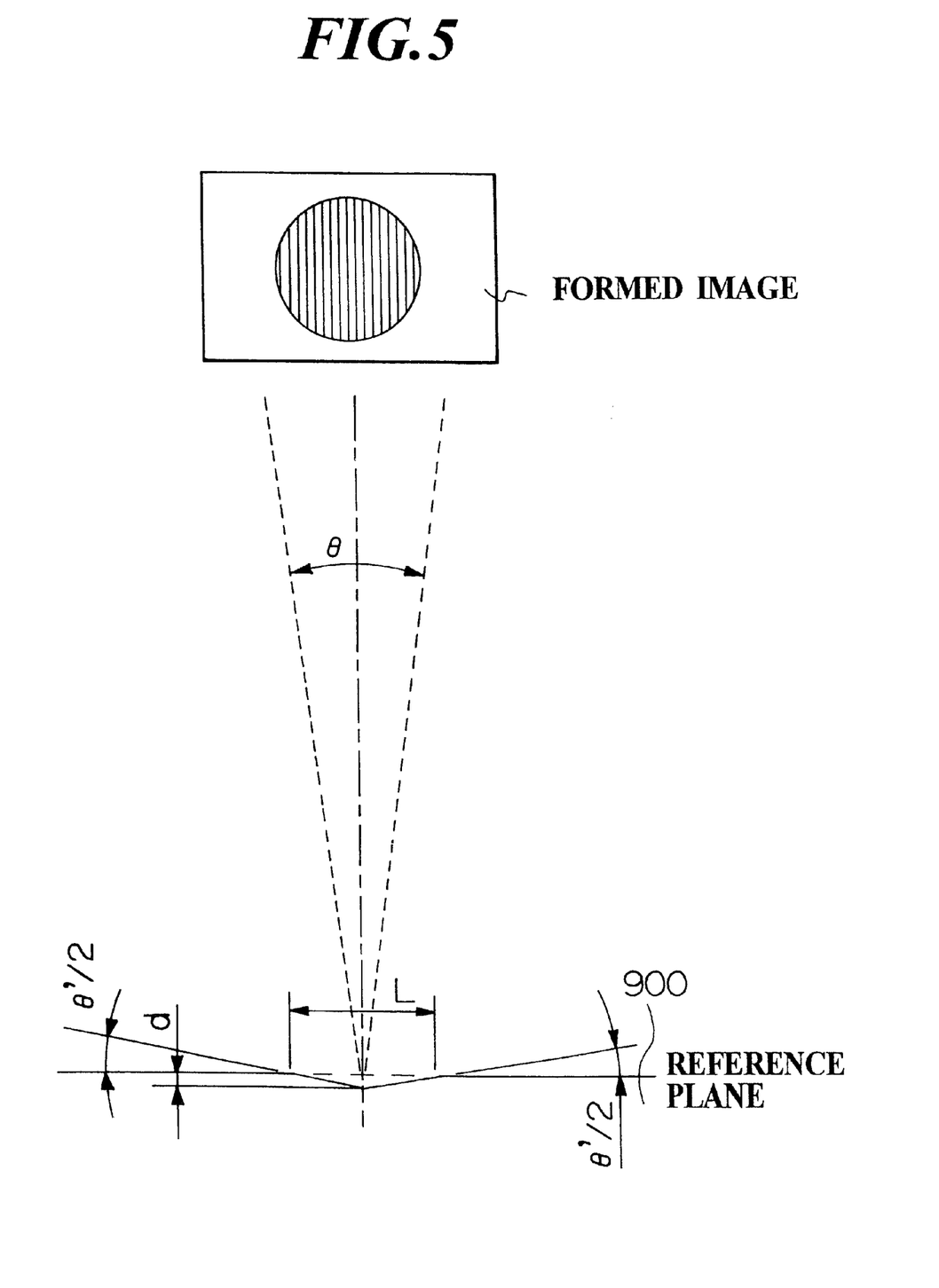
FIG. 5 is an explanation view of image forming operation of the surface inspecting apparatus according to the present invention.

In cases where the object-side angular angle θ is set so that the whole reflected light beams from a plane parallel to the reference plane enter just the aperture of the aperture stop 310, and the illuminating light is irradiated in the normal direction with respect to measurement objective region, as shown in FIG. 5, when the inclination angle of the slope (θ'/2 of the concave is larger than (θ/2), the reflecting lights from the slope do not pass at all through the aperture of the aperture stop 310, so that the obtained image of the concave has a luminance of 0%, while the other portions (even portion) have a luminance of 100%.

Figure 6A:
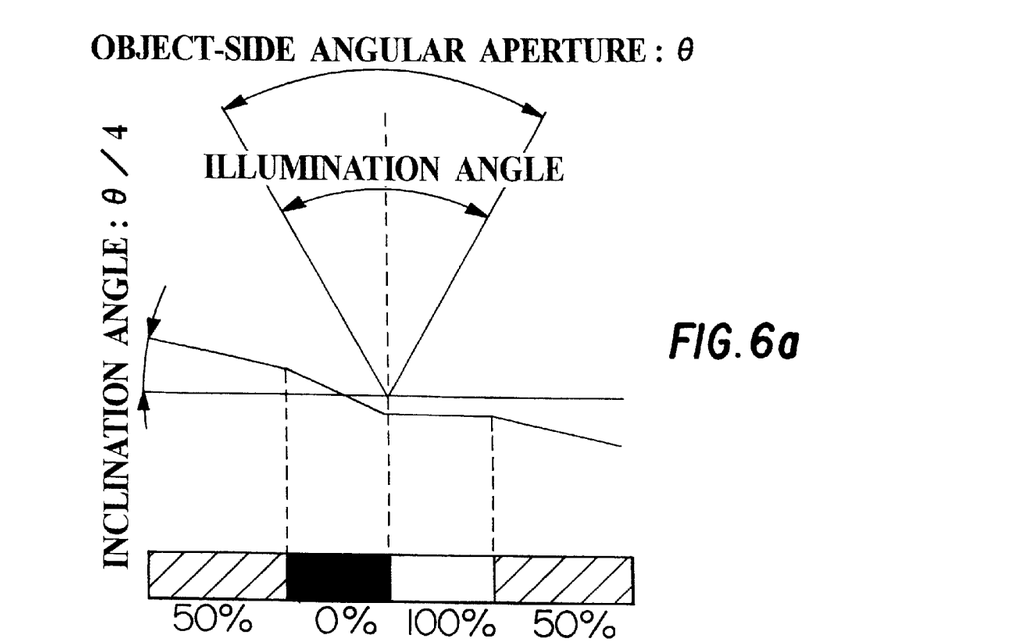
FIGS. 6A–6B are explanation views of image forming operation of the surface inspecting apparatus according to the present invention.
Figure 6B:
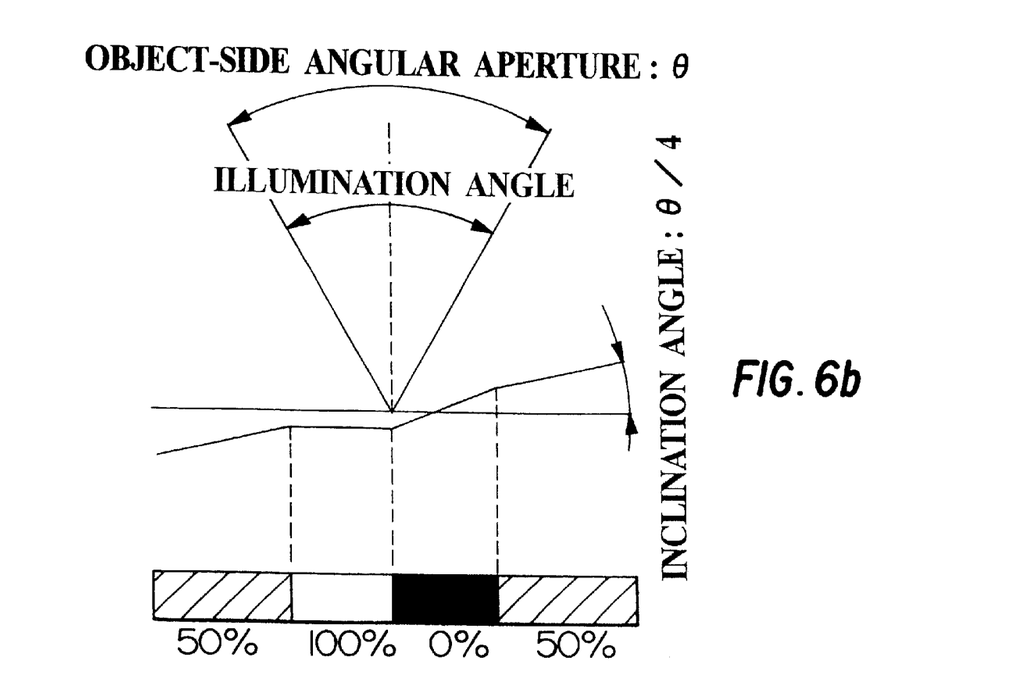

When the measurement objective region is inclined at an angle of θ" (=θ/4) from the state shown in FIG. 5, the inclination of one side slope (surface A) of the concave with respect to the reference plane is now ((θ'/2)−(θ/4)), and the inclination of the other side slope (surface B) with respect to the reference plane is ((θ'/2)+(θ/4)). In this case, when the inclination of the slope (θ'/2) is equal to (θ/4), because the one side slope (surface A) becomes parallel to the reference plane, the whole reflected light from the slope does enter the aperture of the aperture stop 310. As a result, the image of the portion has a luminance of 100%. On the contrary, because the other side slope (surface B) has an inclination of (θ/2) with respect to the reference plane, the whole reflected light from the slope does not enter at all the aperture of the aperture stop 310. As a result, the image of the slope (surface B) has a luminance of 0%. In this case, because the even portion has an inclination of (θ/4) with respect to the reference plane, only a half of the reflected light from the even portion enter the aperture of the aperture stop 310, the image of the portion has a luminance of about 50%, as shown in FIGS. 6(a) and 6(b).

On the other hand, in cases where the object-side angular aperture θ is set to be twice the spread (divergence) angle of the reflected lights from the even portion in the measurement objective region (in cases where twice the illumination angle is equal to the object-side angular aperture θ), when the measurement objective region is inclined at an angle of θ" (=θ/4) from the state shown in FIG. 5, the image of the even portion has a luminance of about 50%, the image of one slope (surface C) in the concave having a inclination angle (θ'/2) which is (θ/4) has a luminance of about 100%, and the image of the other slope (surface D) has a luminance of about 0%.

In the surface inspecting apparatus according to the above-described embodiments, although images are formed with a luminance corresponding to the incident angle for the measurement objective region, it is clearly possible to freely adjust the sensitivity for inspecting the concave by changing the diffusion (divergence) angle of the reflected lights from the even portion in the measurement objective region, that is, the irradiation angular aperture, or by changing the object-side angular aperture θ. Therefore, in this embodiment, an angular aperture changing member 330 for changing the angular aperture of the aperture stop 310 is provided to freely change the object-side angular aperture θ. If an aperture diameter changing member 125 for changing the aperture diameter of the aperture stop 112 is also provided to move with each other, it is possible to very easily adjust the sensitivity.

In the surface inspecting apparatus according to the embodiments, although the image pickup part 400 picks up images which was formed by the object-side telecentric optical system 300, while the processing part 510 collects the luminance data for every pixel (for each point in the measurement objective region), the luminance data with respect to positions thereof are collected for example with 256 gradations.

In the case, it is desirable to collect both luminance data obtained in the case of an inclination of the measurement objective region in one direction (X direction) and luminance data obtained in the case of an inclination of the measurement objective region in the other direction (Y direction) crossing with the X direction.

In general, when a measurement objective region is inclined with respect to the reference plane, luminances of respective points are changed corresponding to the inclination thereof with respect to the reference plane. The surface inspecting apparatus according to this embodiment enables determination of the presence or absence and the shape of the irregular portions by using the variation of luminances. In this case, however, it may occur some cases wherein the irregular portions (such as undulation or slip) having a crest and a valley extending along a single axis can not be exactly inspected only by inclining the measurement objective region with respect to the single axis.

In order to solve the problem, the measurement objective region is preferably inclined with respect to X and Y axes crossing with each other in the reference plane (preferably, with the same inclination angle), and the luminance data are collected in the respective inclined position.

The processing part 510 determining a distribution of inclination in the measurement objective region by primary-differentiating a distribution of the luminance data, determines an integral data of the luminance data, or determines a regression curve from the integral data. Further, the processing part 510 indicates a predetermined direction and informs each kind of data, to a data transform part (Fourier transform part) 520.

According to the Fourier transform part 520, it is possible to suitably adopt a fast Fourier transform apparatus (FFT). Further, it is also possible to adopt an apparatus which enables spatial-frequency-analysis of the luminance data other than an FFT. For example, it is possible to use a discrete cosine transform apparatus (DCT), or the like. Further, it is also possible to use an apparatus for frequency dividing by the maximal entropy method.

In general, the luminance data has a high-spatial frequency component with respect to length according to a periodic irregular pattern formed in the measurement objective region and a low spatial-frequency component with respect to length according to flexure, distortion and the like, as a whole the measurement objective region, in a mixed state. For example, in a semiconductor wafer having circuits formed to arrange periodically thereon, the high spatial-frequency component is caused by a component according to the periodic formed circuit pattern and the low frequency component is caused by a component according to a flexure and a distortion arisen by heat treatment or the like on the semiconductor wafer.

The data transform part 520 performs a Fourier transformation of the luminance data in a predetermined direction indicated by the processing part 510, to produce Fourier transformed images. The Fourier transformed images are sent back to the processing part 510. As the predetermined direction, one or more directions are selected, according to the state of the periodicity of the irregular pattern formed in the measurement objective region. That is, if the periodicity of the irregular pattern is one-dimensional, it is suitable to select a direction corresponding to the periodicity. If the periodicity of the irregular pattern is two-dimensional, it is suitable to select one direction corresponding to a periodicity and a second direction perpendicular to the one direction. In the case when directions not less than two are selected, a Fourier transformation is preferably carried out to the data in each of the directions. Then, low spatial-frequency components are removed from the fundamental frequency data analyzed by the Fourier transformation to extract a high spatial-frequency component; or high spatial-frequency components are removed from the fundamental frequency data analyzed by the Fourier transformation to extract a low spatial-frequency component. In the other hand, the processing part 510 indicates a predetermined direction to the data transform part 520; and the data transform part 520 transforms the data of the high spatial-frequency component in the predetermined direction indicated by the processing part 510, by inverse Fourier transformation and sends the inverse-Fourier transformed data to the processing part 510.

The data sent from the data transform part 520 to the processing part 510 may form an image having just an irregular pattern only formed periodically by removing low spatial-frequency components from the image picked up by an image pickup part 400 or form an image having just an irregular pattern only formed periodically by removing high spatial-frequency components from the image picked up by the image pickup part 400. For example, in an inspection of the surface of a wafer which has a circuit pattern formed thereon, the data may form an image having the irregularity of the circuit pattern formed periodically on the wafer by removing the irregular components having a large period, e.g., a period near the whole length of the wafer; or the data may form an image having the irregularity having a large period, e.g., a period near the whole length of the wafer by removing the irregular components of the circuit pattern formed periodically on the wafer.

Thus, it is possible to suitably inspect an irregular pattern having a desired period which is formed in the measurement objective region.

(Second Embodiment)

Figure 7:
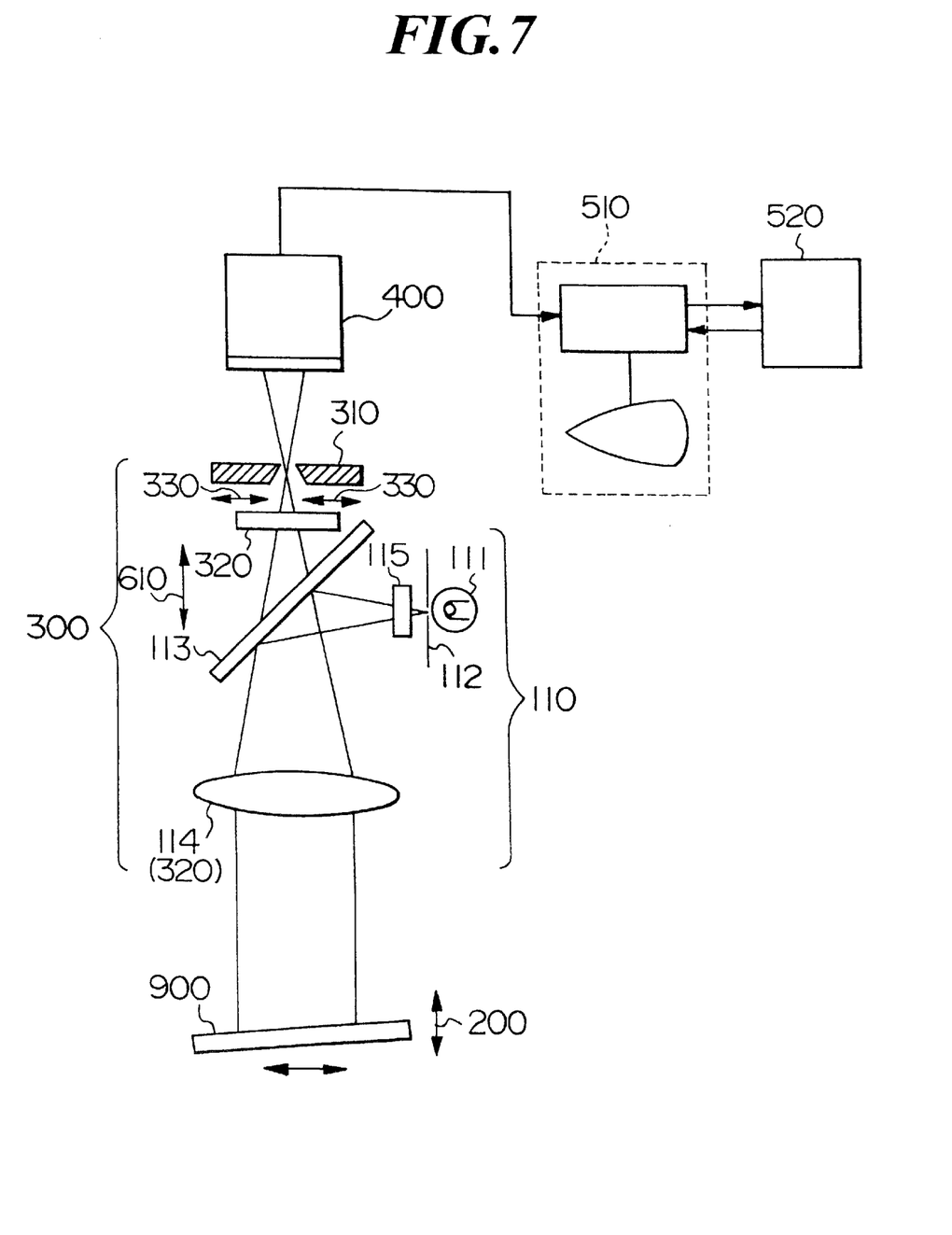
FIG. 7 is a view showing the construction of a surface inspecting apparatus according to the second embodiment of the present invention.

FIG. 7 shows a construction of a surface inspecting apparatus according to the second embodiment of the present invention. As shown in the figure, the apparatus according to the second embodiment is different from the first embodiment in that a light irradiation section 110B further comprises a band pass filter 115 which can selectively passes through a light having a wavelength in a predetermined range.

In the surface inspection of the present Invention, when a surface having a periodic irregular pattern thereon is irradiated with an illuminating light, the periodic irregular pattern may function as a diffraction grating. Accordingly, if the illuminating light has wavelengths in a wide range, not only a O-order diffracted light by a reflection but also a n-order (n≠0) diffracted light may be created.

A wavelength λn of the diffracted light can be represented by the following equation:

$$\lambda n = (d \cdot \sin(\theta n))/n \quad (1)$$

where θn is the outgoing angle and d is the period of the irregular pattern. The wavelength λn is dependent on also the quality of the film on the semiconductor wafer.

The diffracted lights form individual observed images independently which do not match up to each other, so that the observed images are out of focus. Therefore, it is possible to precisely inspect a surface by generating only a predetermined order of a diffracted light.

According to the present embodiment, the surface inspecting apparatus operates like the first embodiment except that the wavelength range of the illuminating light for illuminating the measurement objective region is limited.

According to the present embodiment, the apparatus inspects a surface without an image by an unnecessary order of a diffracted light which degrades the accuracy of the inspection. Therefore, the inspecting apparatus enables more precise inspection of a surface than the first embodiment.

A wavelength range to be selected by the band pass filter 115 is changed by the wavelength range of the light from the light source 11 and by the period of the irregular pattern in the measurement objective region. Therefore, it is preferable that the band pass filter 115 can be exchanged. In particular, it is preferable that a band pass filter having a plurality of transmissive wavelength ranges is prepared and the transmissive wavelength range is selected by the instruction of the processing part 510.

(Third Embodiment)

Figure 8:
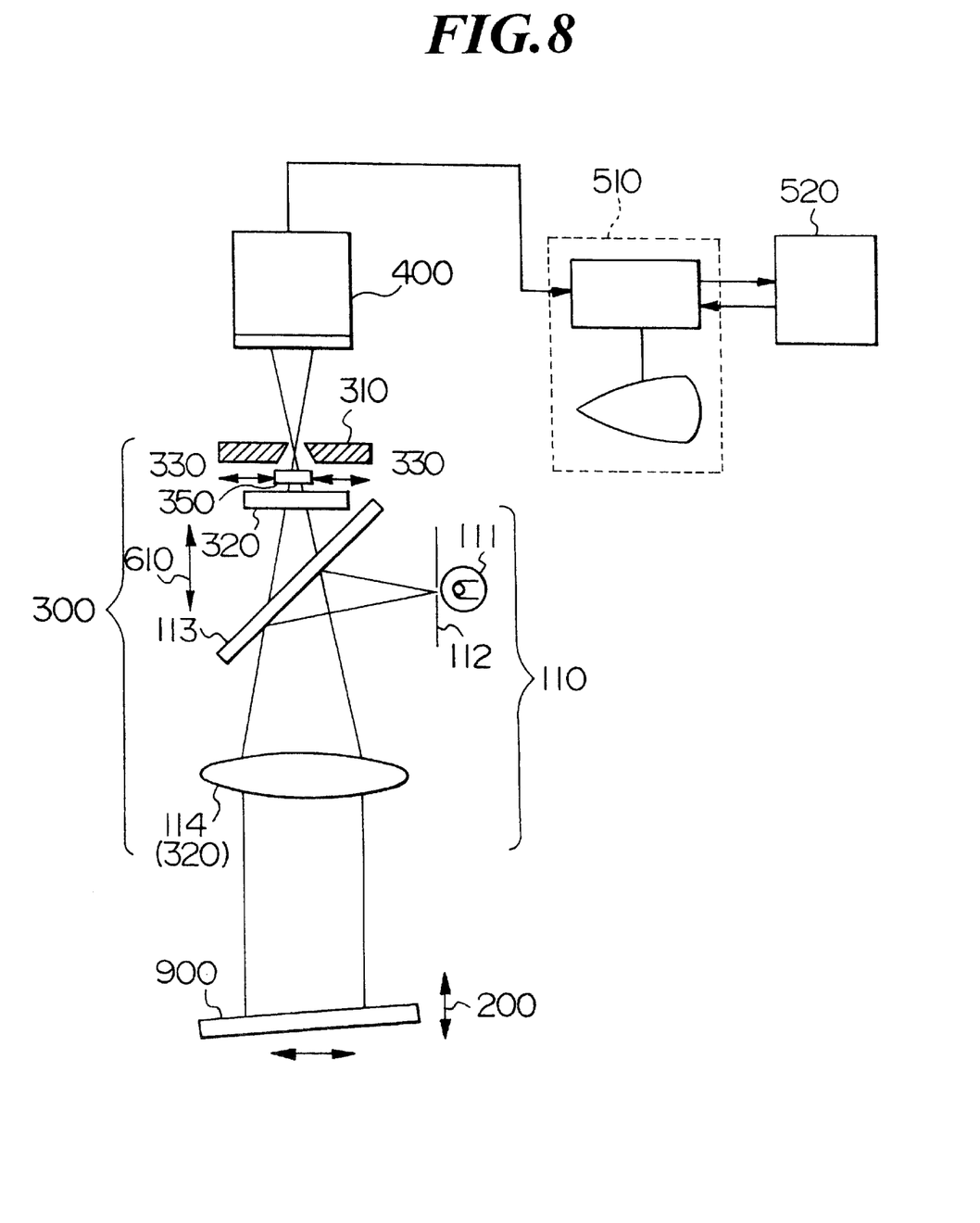
FIG. 8 is a view showing the construction of a surface inspecting apparatus according to the third embodiment of the present invention.

FIG. 8 shows a construction of a surface inspecting apparatus according to the third embodiment of the present invention. As shown in this figure, the apparatus according to the third embodiment is different from the first embodiment in that the apparatus further comprises a band pass filter 350 for interrupting a diffracted light having a wavelength other than a predetermined order of diffracted light caused by a predetermined periodic irregular pattern, and the band pass filter 350 is disposed in the course of the optical path from the measurement objective region to the image pick up part 400.

According to the second embodiment, the surface inspecting apparatus prevents a diffracted light having a wavelength other than a predetermined order of diffracted light from arriving at the image pick up part 400 in the generation stage of the illuminating light. On the contrary, according to the third embodiment, the surface inspecting apparatus limits the light having a wavelength which can arrive at the image pick up part 400, from the whole lights reflected from the measurement objective region.

That is, the surface inspecting apparatus of the present embodiment removes an unnecessary order of a diffracted light which degrades the accuracy of the inspection, by the band pass filter 350 before the light from the measurement objective region arrives at the image pick up part 400. Except this point, the surface inspecting apparatus of the present embodiment operates like that of the first embodiment.

According to the present embodiment, the apparatus inspects a surface without an image by an unnecessary diffracted light which degrades the accuracy of the inspection, like the second embodiment. Therefore, the inspecting apparatus enables more precise inspection of a surface than the first embodiment.

A wavelength range to be selected by the band pass filter 350 is changed by the wavelength range of the light from the light source 111 and by the period of the irregular pattern in the measurement objective region. Therefore, it is preferable that the band pass filter 350 can be exchanged. In particular, it is preferable that a band pass filter having a plurality of transmissive wavelength ranges is prepared and the transmissive wavelength range is selected by the instruction of the processing part 510.

The present invention is not limited to the embodiment as described above and various changes may be made. For example, according to the embodiment as described above, an operation of Fourier transform or inverse Fourier transform is carried out to data obtained after picking up an image. However, it is also possible to carry out the operation of Fourier transform or inverse Fourier transform in a optical system.

In the above-described embodiment, only a direct surface inspection for the surface of a semiconductor wafer on which a circuit pattern is formed periodically has been explained for example. However, the surface inspection of the present invention can be applied to a back surface of the semiconductor wafer which has a lot of fine irregularities or to a cut surface of a wafer or the like by a wire saw having periodic steps.

Industrial Applicability

Typical effects according to the present invention will be explained as follows. According to the present invention, because the spatial frequency of the luminance data in a predetermined direction is analyzed to make a plurality of frequency data and a predetermined spatial frequency component is extracted the made frequency data, it is possible to detect the state of desired irregularity.

What is claimed is:

1. A surface inspecting method for inspecting a surface condition a measurement objective region to be measured, which comprises a periodic irregular pattern with a period, by irradiating the measurement objective region with an illuminating light of an approximately parallel beam, comprising:

a first step of irradiating a measurement objective region with an illuminating light in an oblique direction thereto;

a second step of forming an image of reflected light from the measurement objective region by one system selected from the group consisting of an object-side telecentric optical system and an image-object-side telecentric optical system, which has an optical axis coinciding with an incident direction of the illuminating light to the measurement objective region, the formed image of reflected light having points with luminance corresponding to the incident angle of the illuminating light at respective points on the measurement objective region;

a third step of picking up the formed image to collect luminance data of respective points in the measurement objective region;

a fourth step of analyzing spatial frequencies of the luminance data in a desired direction to make a plurality of spatial frequency data; and a fifth step of extracting a desired frequency component from the plurality of spatial frequency data, to synthesize.

2. The surface inspection method as claimed in claim 1, wherein the fourth step analyzes frequencies of the luminance data with respect to positions in a desired direction by Fourier transformation to obtain a plurality of frequency data.

3. The surface inspection method as claimed in claim 2, wherein the fifth step extracts desired frequency components from the plurality of frequency and synthesizes the extracted frequency components by carrying out an inverse Fourier transformation.

4. The surface inspection method as claimed in claim 2, wherein low frequency components are removed from the frequencies of the luminance data analyzed by the Fourier transformation to extract a desired high frequency component.

5. The surface inspection method as claimed in claim 4, wherein the high frequency component includes one based on irregular components of a circuit pattern formed periodically on the surface to be inspected.

6. The surface inspection method as claimed in claim 2, wherein high frequency components are removed from the frequencies of the luminance data analyzed by the Fourier transformation to extract a desired low frequency component.

7. The surface inspection method as claimed in claim 6, wherein the high frequency components include one based on irregular components of a circuit pattern formed periodically on the surface to be inspected.

8. The surface inspection method as claimed in claim 1, further comprising a sixth step of selectively passing through only a light having a wavelength in a predetermined range before the light emitted from a light source is picked up.

9. A surface inspecting apparatus for inspecting a surface condition which comprises a periodic irregular pattern with a predetermined period of a measurement objective region to be measured by irradiating the measurement objective region with an illuminating light of a parallel beam, comprising:

a light irradiation part for irradiating an measurement objective region with an illuminating light in an oblique direction of the measurement objective region;

a system selected from the group consisting of an object-side telecentric optical system and an image-objectside telecentric optical system, for forming an image of reflected light from the measurement objective region, which has an optical axis coinciding with an incident direction of the illuminating light to the measurement objective region, the formed image of reflected light having points with luminance corresponding to the incident angle of the illuminating light at respective points on the measurement objective region;

an image pickup part for picking up the formed image to collect luminance data of respective points in the measurement objective region;

a first data changing part for analyzing spatial frequencies of the luminance data in a desired direction to make a plurality of spatial frequency data; and a second data changing part for extracting a desired frequency component from the plurality of spatial frequency data, to synthesize.

10. The surface inspection apparatus as claimed in claim 9, wherein the first data changing part is configured to analyze frequencies of the luminance data with respect to positions in a desired direction by Fourier transformation to obtain a plurality of frequency data.

11. The surface inspection apparatus as claimed in claim 10, wherein the second data changing part is configured to extract desired frequency components from the plurality of frequency data obtained by the first data changing part and to synthesize the extracted frequency components by carrying out an inverse Fourier transformation.

12. The surface inspection apparatus as claimed in claim 10, wherein the second data changing part is configured to remove low frequency components from the frequencies of the luminance data analyzed by the Fourier transformation to extract a desired high frequency component.

13. The surface inspection apparatus as claimed in claim 12, wherein the extracted high frequency component includes one based on irregular components of a circuit pattern formed periodically on the surface to be inspected.

14. The surface inspection apparatus as claimed in claim 10, wherein means are provided for removing high frequency components from the frequencies of the luminance data analyzed by the Fourier transformation to extract a desired low frequency component.

15. The surface inspection apparatus as claimed in claim 14, wherein the high frequency components include one based on irregular components of a circuit pattern formed periodically on the surface to be inspected.

16. The surface inspection apparatus as claimed in claim 9, further comprising a band pass filter for selectively passing through only a light having a wavelength in a predetermined range before the light emitted from the light source is picked up.

17. The surface inspection apparatus as claimed in claim 9, wherein a light source is arranged proximate to the band pass filter.

18. The surface inspection apparatus as claimed in claim 9, wherein the band pass filter is disposed in the course of an optical path from the measurement objective region to the image pick up part.

* * * * *